United States Patent
Nachtigal et al.

(10) Patent No.: US 6,559,633 B1
(45) Date of Patent: May 6, 2003

(54) SPEED SENSOR WITH A SEAL

(75) Inventors: Daniel Nachtigal, Ann Arbor, MI (US); Casimir R. Kiczek, Ann Arbor, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 09/664,246

(22) Filed: Sep. 18, 2000

(51) Int. Cl.[7] .............................. G01P 3/44; G01P 3/487; F16C 32/00; F16J 15/32
(52) U.S. Cl. ................... 324/174; 324/207.25; 384/448
(58) Field of Search ....................... 324/207.2–207.25, 324/173, 174; 384/448; 277/317, 353, 402, 403

(56) References Cited

U.S. PATENT DOCUMENTS

| | | | |
|---|---|---|---|
| 5,184,069 A | | 2/1993 | Adler et al. |
| 5,431,413 A | * | 7/1995 | Hajzler ................... 384/448 X |
| 5,458,420 A | * | 10/1995 | Otto ............................ 384/448 |
| 5,470,157 A | * | 11/1995 | Dougherty et al. .......... 384/448 |
| 5,523,681 A | | 6/1996 | Hajzler et al. |
| 5,564,839 A | | 10/1996 | Ouchi et al. |
| 5,611,548 A | * | 3/1997 | Dahlhaus ................ 384/448 X |
| 5,873,658 A | * | 2/1999 | Message et al. ............ 384/448 |
| 5,898,388 A | * | 4/1999 | Hofmann et al. ....... 384/448 X |
| 5,969,518 A | * | 10/1999 | Merklein et al. ............ 324/173 |

* cited by examiner

Primary Examiner—Gerard R. Strecker
(74) Attorney, Agent, or Firm—MacMillan, Sobanski & Todd, LLC

(57) ABSTRACT

A speed sensing seal with a first support member, a second support member, a magnetic elastomer member, a sensor member and an elastomeric seal member is disclosed. The magnetic elastomeric member with alternating adjacent poles is formed on the first support member and the sensor member is attached to an aperture in the second support member and overmolded with a layer of elastomer. The first and second support members are formed in the unitized body to form an internal cavity which contains the sensor, magnetic member, and the elastomeric seal. The first support member has a low wear surface to reduce initial seal failures and to enhance seal life.

9 Claims, 2 Drawing Sheets

SPEED SENSOR WITH A SEAL

BACKGROUND OF THE INVENTION

A speed sensing device for producing a signal corresponding to the relative angular rotation between two structural members is well known in the prior art. With the increase in electronic controls for vehicle systems, a need has been found for numerous speed sensing devices in vehicles with increasingly stringent angular motion discrimination. Contributing to this growing interest in speed sensing devices in motor vehicles is the popularity of anti-lock braking systems (ABS), the advancement of controls for automatic transmissions, and traction control. These developments have led to the incorporation of speed sensing devices into sealing packages. Such configurations incorporate a speed sensor into a radial shaft seal or into a bearing seal to keep out dirt and retain lubrication in the device.

The speed sensor reacts to a stimulus or a signal with a corresponding electrical signal. In a speed sensor device, the component which produces a stimulus corresponding to the rotating shaft speed is called a target wheel or target and the other component which reacts to this stimulus with an electrical signal is called a sensor.

The target may be either active or passive. Active targets, otherwise known as encoders, are those that produce alternating magnetic fields which are sensed and related to shaft speed, and incorporate permanent magnetization. Passive targets, known as tone wheels, are not magnetized components, but instead are usually metal rings with teeth or notches, and may be integrated within seals as well. Sensors can also be classified as active or passive, depending on whether they produce a field internally or are supplied with external power to do so. Either type of encoder can be integrated with either type of sensor. However, the combination of an active encoder with an active sensor provides advantages in size and performance. Active encoders normally require the magnetization of an elastomeric ring. This requires that the elastomer be vulcanized with ferrite powder/filaments, thus making it unsuitable for sealing. Therefore, the active encoder and seal can only be molded as one component using two-material molding techniques. Active encoders have numerous advantages, including reduction in the size of the target wheel and sensor, weight reduction, reduction in the number of parts, and integration of the components into a small seal package. The active property of the encoder allows use of Hall-effect or magneto-resistive sensors, which are smaller than other sensors used with a passive tone wheel.

The performance of speed measurement systems is constantly increasing. The use of active encoders with active sensors allows wider band widths of the sensing systems, measuring speeds from zero rpm. However, the system's sensitivity to the air-gap, that is, the distance between the encoder and sensor, is a major consideration. This distance must be controlled by precise manufacturing and assembly, to minimize variations.

Various means exist for packaging the seal and encoder. For example, the encoder may be integrated by bonding it to the metal case of a seal, or pressing it against clamps. The sensor, due to its relative size, is usually mounted externally of the seal. It is preferable that any sensor seal design incorporate the full capability of sealing and sensing within a seal package. To accomplish this, the sealing element, encoder and sensor are all encapsulated in a metal case, with just the electric leads of the sensor protruding. Such a design would enable efficient assembly, parts reduction, and improved performance due to small air-gaps and reduced error in assembly.

As previously mentioned, manufacturing the sealing element and the encoder as one is difficult because of the unsuitable sealing properties of magnetizable elastomer. However, some efforts have been made to produce the encoder and seal simultaneously in one process (as in two-point injection molding), to bond the two to the housing after manufacture or to attach them mechanically.

Isolation of both the sensor and the encoder from their surroundings is also of high importance. Active encoders, as the source of a magnetic field, can attract contaminants and ferrite particles if subjected to internal lubrication of a bearing or a shaft. These particles originate from additives in lubricants and/or from wear particles generated due to the contact surfaces of the bearing during normal operation and can ultimately interfere with the magnetic signal by creating couplings between poles. On the other hand, in certain ABS applications, the bearing/axle may be subjected to external contaminants such as water and mud, and to other environmental disturbances such as extreme temperatures, which may affect the exposed encoder or sensor.

Some prior art designs emphasize the need for isolation of the encoder internally, while other designs identify the need to isolate the sensor and the encoder from their external environment. The need for a seal package that encloses and protects the encoder and sensor from the bearing surfaces and the surroundings is desirable.

The packaging of sensor seals creates manufacturing and assembly process challenges. The fragility of magnetic plastoferrite encoder rings is a complicating factor in manufacture and assembly, since the necessary accurate positioning and rigid clamping may increase the chances of breakage. One prior art device utilizes retaining clamps in the seal case to hold the encoder in three axes. Another prior art device relies on bonding the magnetic elastomer to the metal case prior to assembly. Inaccurate assembly might also greatly affect performance due to the above mentioned air-gap sensitivity. Aspects such as repeatability and ease of assembly have been solved by using various clamping methods or with the use of a coupling ring.

Vibration isolation has been achieved by rigid means of assembly of the encoder or by bonding the encoder to an elastomeric layer on the seal case to isolate vibration. External noise that may disturb the sensor signal is minimized by the encapsulation of the sensor within a metal case that acts as a magnetic shield, isolating the sensor from the environment and preserving magnetic energy from the active encoder.

However, these prior art devices are expensive to make and require complicated assembly procedures. Thus there remains a need for a sensor seal that is compact, inexpensive to manufacture, accurate and that does not require complicated assembly procedures.

SUMMARY OF THE INVENTION

The present invention seeks to solve these problems. The sensor seal includes a first support member having a radially extending portion and an axially extending portion and a magnetic elastomeric member on the radially extending portion. The magnetic member forms alternating, adjacent magnetic poles on the radially extending portion. A second support member is adjacent to the first support member. The second support member has a radially extending portion and an axially extending portion. A sensor member is attached to the radially extending portion of the second support member and senses the alternating, adjacent magnetic poles. An elastomeric seal member on the radially extending portion of the second support member, has a radially extending seal portion and an elastomeric body portion. The first and second support members form an internal cavity and a unitized body. The unitized body has an internal cavity that contains the sensor, the magnetic members and the elastomeric seal member. The radially inwardly extending seal portion of the seal member is contiguous with the axially extending portion of the first support member. The axially extending portion of the first support member has a low wear surface to reduce initial seal failure incidents and to enhance the life of the seal.

It is an object of the present invention to provide an encoder device that forms a unitized body with an internal cavity that contains the sensor, the magnetic member and the elastomeric seal and has a low wear surface to enhance initial seal wear-in and seal life.

It is another object of the present invention to provide a method of forming an encoder device with a magnetic member on one support member and a seal member on the other support member with one support member being folded over during the manufacturing process.

It is still another object of the present invention to provide an encoder device that is inexpensive to make, easy to install, rugged and that will seal out harmful contaminates.

These and other features of the present invention will become apparent from the description of the embodiments and the drawings.

BRIEF DESCRIPTION OF THE DRAWINGS

The various advantages of the present invention will become apparent to one skilled in the art upon reading the following specification and by reference to the drawings which include.

DETAILED DESCRIPTION OF THE EMBODIMENTS

Figure 1:
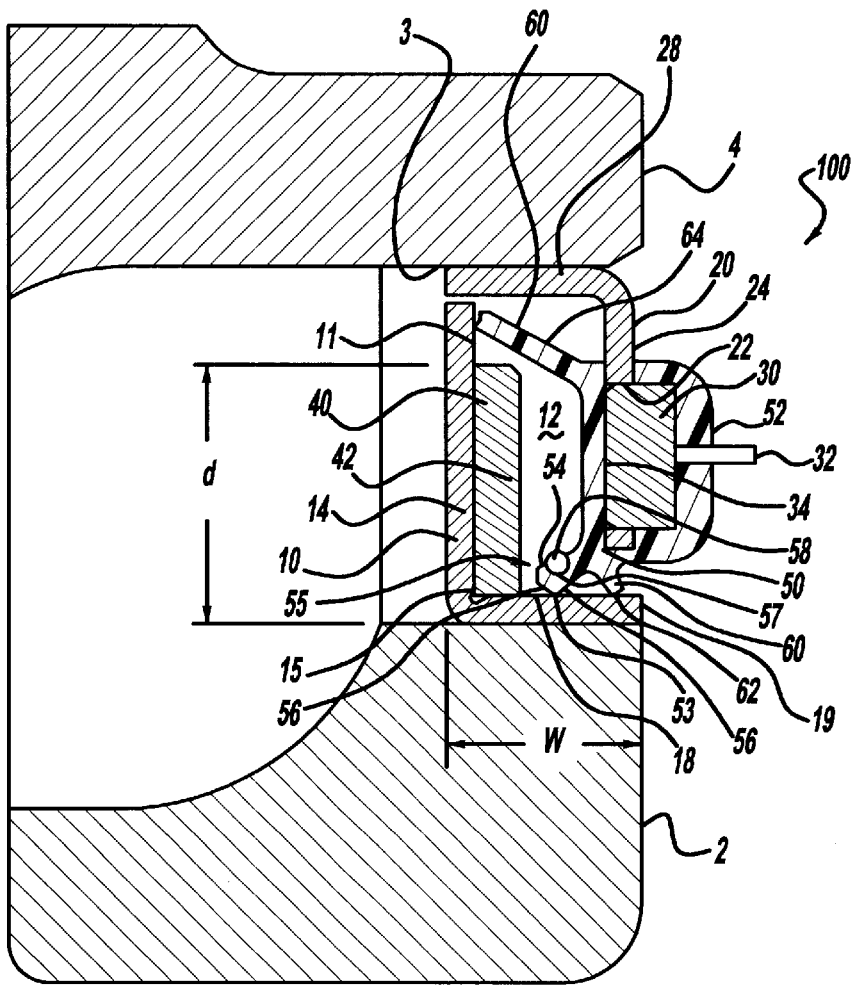
FIG. 1 is a cross sectional view of the speed sensor in a wheel bearing according to the present invention.
Figure 2:
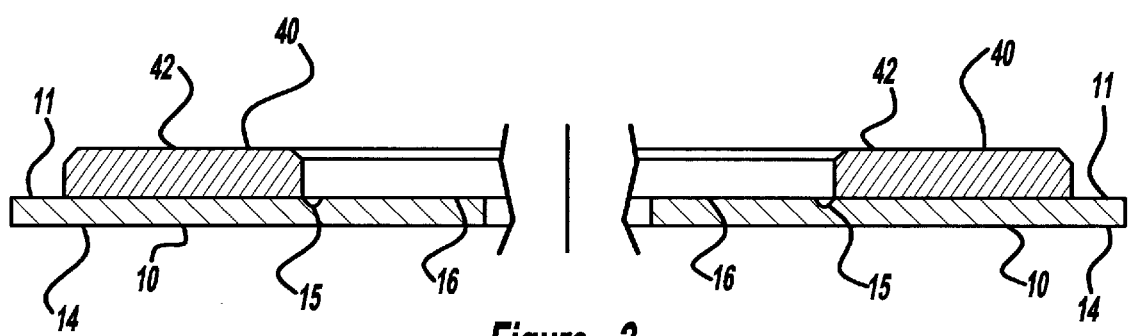
FIG. 2 is a cross sectional view of the first support member and multipole ring member prior to forming the cylindrical axial extending portion.

The speed sensing device according to the present invention is shown in FIGS. 1 and 2 and is designated by the numeral 100. The speed sensing device 100 is disposed in a radial direction between an inner race element 2 and an outer race element 4. The speed sensing device 100 is shown as a component of a motor vehicle wheel bearing assembly (not shown). Each component of the bearing assembly is rotatably mounted relative to one another by a rotating element distributed in the circumferential direction. The invention is suitable for use with bearings having a wide range of designs, including ball bearings, roller bearings, tapered roller bearings and needle bearings. Either thrust or radial bearing configurations may be utilized and can include tapered bearings. Anti-friction bearings having rolling elements, with or without a cage, retainer or separator are included, as well as plain bearings having no rolling elements. Alternatively, the speed sensor device 100 can be adapted for use with a rotary shaft or any other similar rotary application to measure rotation.

The speed sensing device 100 includes a first support member 10 and a second support member 20 and, disposed in an opening 3 between the inner race 2 and outer race 4, are a rotation sensing device 30, a multipole ring member 40 and a seal member 50. The outer race 4 is attached to the motor vehicle frame assembly whereas the inner race 2 is attached to the wheel so as to rotate with the motor vehicle wheel. Those skilled in the art will recognize that the speed device 100 may also be adapted for use where the outer race is attached to the wheel and the inner race is attached to the frame assembly.

The rotation sensing device 30 is disposed in an aperture 22 in the radial portion 24 of the second support member 20. The multipole ring member 40 is attached to the radial portion 14 of the first support member 10 in the internal cavity 12. The multipole ring member 40 faces the rotation sensing device 30.

In the preferred embodiment, the first support member 10 also includes a notch 15 which is adjacent to the multipole ring 40. The second support member 20 also includes an axial portion 28 which is adjacent to the outer race 4. The first support member 10 and second support member 20 are preferably made of stainless steel for corrosion resistance but, alternatively, they may be made of a polymeric material with magnetizable material. The polymeric material may be a thermoplastic or thermoset plastic or the support member 20 may also be made of a ferrous material such as steel which is treated for corrosion resistance.

The multipole ring member 40 is preferably made of a magnetizable material in an elastomeric material such as nitrile (NBR), hydrogenated nitrile (HNBR), polyacrylate (ACM), ethylene acrylate, fluorocarbon (FKM), a thermoplastic elastomer (TPE), a fluoropolymer, a thermoplastic vulcanizate (TPV) or any other similar material suitable for the application. The magnetizable material is a ferrite powder or ferrite filaments. The magnetizable elastomeric material has north and south poles alternating in the circumferential direction and extending in the radial direction which, as the wheel rotates, move alternatively past the rotating sensing device 30. The rotation device 30 may be a Halleffect device or a magneto-resistance device.

The seal member 50 is molded to the radial portion 24 of the second support member 20 so that the seal body. 52 covers the projecting portion end of the rotating sensing device 30 facing the multipole ring member 40.

The seal member 50 has a radial lip primary seal 55, extending generally in the radial direction from the seal body 52. The radial lip primary seal 55 includes a first radially extending sealing member 54, which has a garter spring 58 located in an annular groove 57 on the first radially extending seal member 54. The first radially extending seal member 54 is in fluid tight sealing contact with a smooth wear surface 18 on the axial portion 19 of the first support member 10. The smooth wear surface 18 is disposed radially inwardly of the primary radial lip seal member 55. The present invention applies equally to seals wherein these elements are reversed, that is, the sealing element is urged radially outwardly against a seal wear flange that is disposed radially outwardly of the principal seal element. It will also be understood that the invention applies equally to seals with unitizing elements wherein the wear sleeve element is located on a rotary shaft or the like and is disposed radially inwardly of the primary radial lip seal member 55 or wherein the elements are reversed, that is, with the seal band of the primary radial lip seal member 55 urged radially outwardly against a seal companion flange or the unitizing element is disposed radially outwardly of it.

The seal member 50 is preferably made of a polymeric material such as NBR, HNBR, ACM, FKM, Fluoropolymer, Ethylene Acrylate, TPE, TPV or any other similar material suitable for the application. In practicing the invention, the seal member 50 and the multipole ring member 40 need not be made of the same elastomeric material since optionally, the seal member 50 and the multipole ring member 40 may be formed separately using different processes for forming each member.

The first radially extending sealing member 54 portion of the radial lip primary seal 55 preferably has a pair of fiasto-conical sealing surfaces 56, with an edge 53 therebetween, and the annular groove 57 with the garter spring 58. The seal member 50 also includes at least two excluder seals 60. The radial lip primary seal 55 includes a first excluder seal member 62, of the excluder seals 60, adjacent to the first radially extending sealing member 54. The other of the excluder seals 60 is a second excluder seal member 64, extending from the seal body 52 to engage a wear surface 11 of the radial portion 14.

The multipole ring member 40 is formed on the radial surface 14 of the first support member 10 when the support member is in the form of a flat disk member, as best shown in FIG. 2. During the process of forming the multipole ring member 40, the first support member 10 is clamped between a pair of mold tools. Normally, one of the mold tools is stationary and the other of the mold tools moves toward the stationary tool to close off a cavity in a rubber molding machine (not shown). As this occurs, the rubber or elastomer material is injected into the closed off cavity, or rubber preforms are placed in the cavity before closing the mold halves and are compressed to form the multipole ring member 40 on the radial surface 14. The tool has an externally extending member which bears on the support member 10 so as to form a notch 15 adjacent to the inner radial edge of the multipole ring member 40. When one of the mold tools opens, the first support member 10 and the multipole ring member 40, are removed from the mold in the molding machine (not shown). The radial portion 16 of the first support member 10 below the inner radial edge of the multipole ring member 40 is then bent at the notch 15 so as to form a cylindrical axial portion 19. The axial portion 19 is ground to form a smooth wear surface 18 by a surface smoothing technique which uses an abrasive impregnated rubber wheel or a similar surface-smoothing device. The seals 54 and 62 will be in surface contact with and seal along the wear surface. 18, as can be seen best in FIG. 1.

The first support member 10 with the radial portion 14, the notch 15, the axial portion 19 with the smooth wear surface 18, and the multipole ring member 40, are then assembled to the second support member 20 so that the multipole ring member 40 faces the rotation sensing device 30. The seal 55 presses against the first wear surface 18 and the second excluder seal 64 presses against the wear surface 11, thus forming the cavity 12. The edge 53 of the first radially extending seal member 54, and the first excluder sealing member 62, sealingly engage the smooth wear surface 18. The first exclude sealing member 62 prevents dust from migrating along the axial portion 19 toward the sealing member 54. The sealing member 54 prevents lubricating fluid that may be used to lubricate the rotating elements from migrating out of the cavity 12.

The second excluder seal member 64 sealingly engages the second seal wear surface 11, adjacent to the multipole ring member 40, in order to prevent the migration of dust or metal particles into the internal cavity 12.

Since the primary seal member 55 interfaces with the smooth wear surface 18, which minimizes any surface imperfections in the axial portion 19, the speed sensor device 100 of the present invention is more reliable. The cost of fabricating the speed sensing device 100 is less expensive since the seal member 50 is formed in the second support member 20 separately from the formation of the multipole ring member 40 on the first support member 10. Furthermore, protection of the sensor 30 is achieved using the same elastomer used for the seal 50, generally, in a combined molding process, without the additional molding of an external sensor. Finally, the speed sensing device 100 is compact sine the rotation sensing device 30 can be located optimally to improve responsiveness of the rotation sensing device 30 to the multipole ring member 40 rotational movement.

The radially outward edge of the multipole ring member 40 extends a distance d from the radially inner periphery of the axially extending portion 19. Preferably, the distance d is at least 4 mm, and more preferably between 5 mm to 7.5 mm, for the rotation sensing device 30 to detect the alternating magnetic poles 42. The detection end 34 of the sensing device 30 faces the alternating magnetic poles 42 in order to detect the relative rotary motion of the multipole ring member 40. The detection end 34 may be optimally covered with the seal body 52 in order to prevent the accumulation of debris or moisture and to reduce any vibration which can affect the performance of the rotation sensing device 30. The width W of the speed sensing device 100 is at least 3 mm and, more preferably, between 4 mm and 6 mm. The width W extends from the end of the axial portion 28 to the exterior of the radial portion 24. The ratio of the distance d divided by the width W (d/W) is in the range of 0.6 to 2.5 and preferably the range is from 0.7 to 1.4.

The multipole ring member 40 is molded onto the first support member 10 and the elastomeric material with magnetizing particles is vulcanized or at least partially cross-linked in a molding machine (not shown). The vulcanized or post cured elastomeric material which forms the multipole ring member 40 is then magnetized to form the alternating magnetic poles 42 as is well known in the art.

Additionally, since the rotation sensing device 30 is encapsulated in the seal body 52, the rotation sensing device 30 is accurately oriented relative to the first support member 10 which also enhances reliability of the speed sensor seal. Only the leads 32 extend out of the seal body member 52. Thus there is no need for any additional protection to the sensing device 30 and the manufacturing process is simplified since the encapsulation step and the seal molding process occur at the same time.

In operation, as the wheel rotates, the first support member 11 and the multipole ring member 40 rotate with the inner race element 2, which is rotationally fixed to the wheel. The second support member 20, with the rotation sensing device 30, is rotationally fixed to the outer race element 4, which is attached to a motor vehicle frame. Thus, there will be relative rotation between the rotation sensing device 30 and the multipole ring member 40. The sensing device 30 detects the alternating north and south poles of the multipole ring member 40, and thus the rotation of the wheel. Because the rotation sensing device 30 is encapsulated in the seal body member 52, the axial spacing of the device 30 to the multipole ring member 40 is defined by the axial spacing of the first support member 10 relative to the second support member 20. The fist sealing members 54, 62 and 64 will provide the sealing, as noted above, even as the first support member 10 and the second support member 20 rotate relative to one another.

Figure 3:
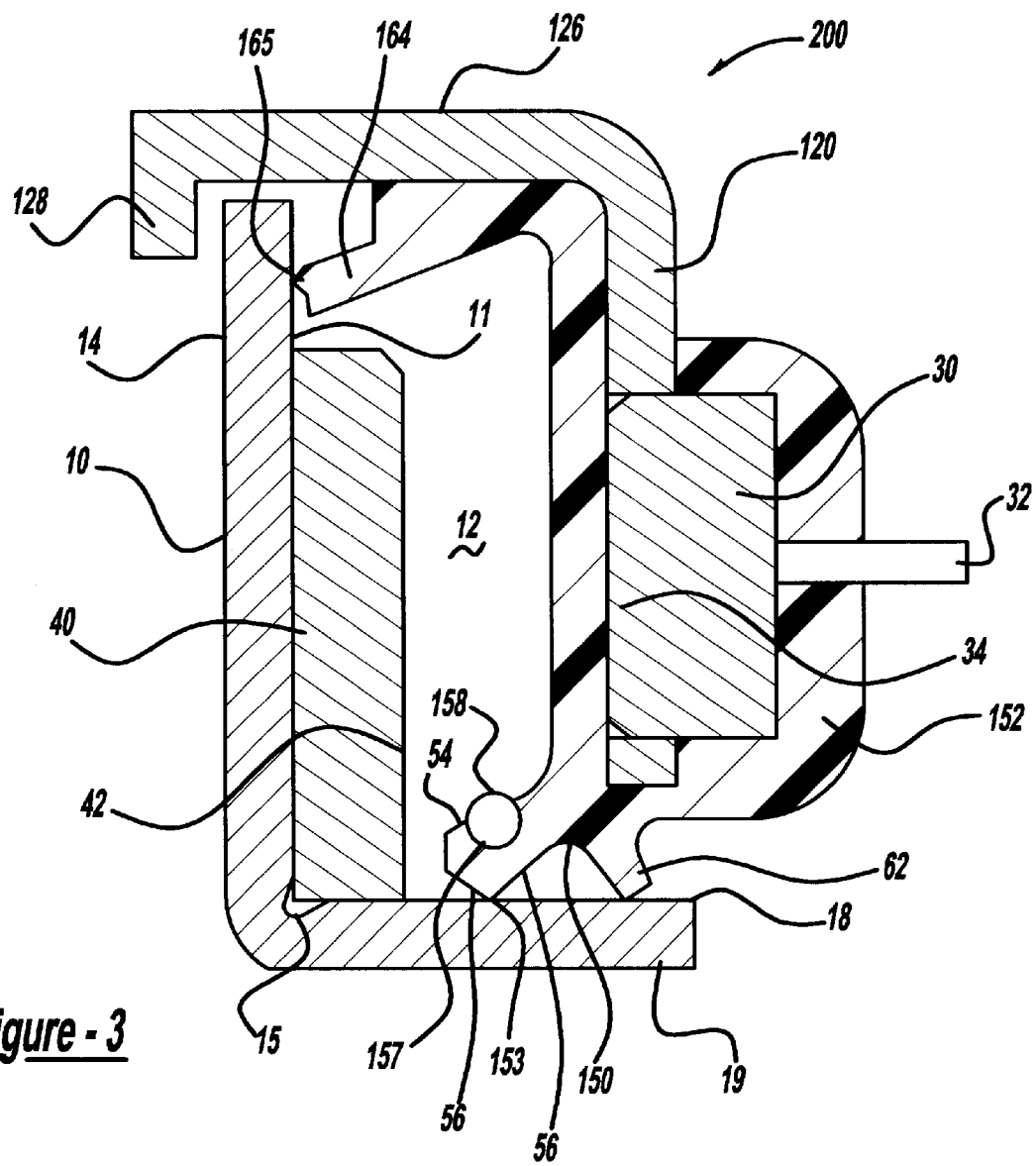
FIG. 3 is a cross sectional view of an alternative embodiment of the present invention.

An alternative embodiment of the speed sensing device, shown in FIG. 3, is designated by the numeral 200. Where the elements are the same as in the first embodiment, the numerals will remain the same. The speed sensing device 200 combines the first support member 10 and a second support member 120 into a single or "unitized" assembly which is held together for cooperative sealing. By pre-assembling these elements together, proper dimensional installation is achieved, protection against nicking or other damage to the sealing elements and multipole ring 40 during handling is avoided, prelubrication of the seal, if desired, may be insured, and correct dimensional tolerances may be controlled at the point where the seal is manufactured as opposed to the point at which the other parts are manufactured and assembled together.

The speed sensing device 200 has two major parts that rotate relative to each other, the same as in the first embodiment. The device 200 can be installed in place between the inner shaft (e.g. inner race) element and the outer bore (e.g. outer race) element in the opening, the same as in the first embodiment. The specific details of the construction of the unitized seal will now be discussed.

The speed sensing device 200 includes the fist support member 10, a second support member 120, the rotation sensing device 30, the multipole ring member 40 and a seal member 150. The seal member 150 has the first radially extending sealing member 54 extending from a seal body 152 in the form of the pair of frusto-conical sealing surfaces 56 with the edge 53 in between. The sealing member 54 also includes the annular groove 57 with the garter spring 58. As in the first embodiment, the pair of frusto-conical sealing surfaces 56 forms the primary seal wear surface which rubs against the smooth wear surface 18 of the axial portion 19. Optionally, the sealing member 54 may be a radial lip with an end or tip. The second support member 120 has a radially extending internal portion 128 which extends axially beyond the edges of the radially extending portion 14 of the first support member 10. The radially extending internal portion 128 also extends radially inwardly of the radial portion 14 to axially lock the first support member 10 and the second support member 120 together to form a unitized assembly. Optionally, the second excluder seal 164 is molded to the axially extending portion 126 of the second support member 120. The seal 164 extends from the seal body member 152. A tip 165 of the seal 164 rubs against the second seal wear surface 11 of the first support member 10. In all other aspects, the operation of the speed sensing device 200 is the same as the speed sensing device 100 of the first embodiment.

While the invention has been described in connection with a preferred and an alternative embodiment, it will be understood that it is not intended to limit the invention to that embodiments only. On the contrary, it is intended to cover all alternative modifications and equivalents that may be included within the spirit and scope of the invention as defined by the appended claims.

What is claimed is:

1. A speed sensing seal comprising:

a first support member having a radially extending portion and an axially extending portion, each of the radially and axially extending portions including a wear surface;

a second support member adjacent the first support member, the second support member having a radially extending portion with an aperture and an axially extending portion;

a rotation sensing device disposed in the aperture of the radially extending portion of the second support member;

a seal member provided on the radially extending portion of the second support member in such a manner as to cover the rotation sensing device, the seal member including a first extending sealing member and a second extending sealing member, wherein the first extending sealing member engages the wear surface of the axially extending portion of the first support member and the second extending sealing member engages the wear surface of the radially extending portion of the first support member so that a cavity is formed and bounded by the first support member and the seal member; and a magnetic member provided on the radially extending portion of the first support member and contained in the cavity.

2. The speed sensor seal specified in claim 1 including a notch formed in the second support member.

3. The speed sensor seal specified in claim 2 wherein the notch is formed at a bend delineating an intersection of the radially extending portion and the axially extending portion of the second support member.

4. The speed sensor seal specified in claim 1 wherein the first extending sealing member of the seal member includes a primary lip seal and a first excluder seal.

5. The speed sensor seal specified in claim 4 wherein the second extending sealing member of the seal member includes a second excluder seal.

6. The speed sensor seal specified in claim 1 wherein the second support member includes a radially extending internal portion.

7. The speed sensor seal specified in claim 6 wherein the radially extending internal portion extends axially beyond a termination of the radially extending portion of the first support member.

8. The speed sensor seal specified in claim 1 wherein the magnetic member contacts both the radially and axially extending portions of the first support member.

9. The speed sensor seal specified in claim 1 wherein the magnetic member is also provided on the axially extending portion of the first support member.

* * * * *

UNITED STATES PATENT AND TRADEMARK OFFICE
CERTIFICATE OF CORRECTION

PATENT NO.    : 6,559,633 B1
DATED         : May 6, 2003
INVENTOR(S)   : Daniel Nachtigal and Casimir R. Kiczek It is certified that error appears in the above-identified patent and that said Letters Patent is hereby corrected as shown below:

Column 5,
Line 12, "fiasto-conical" should read -- frusto-conical --; and
Line 57, "exclude" should read -- excluder --.

Column 6,
Line 51, "11" should read -- 10 --.

Signed and Sealed this

Second Day of September, 2003

JAMES E. ROGAN
*Director of the United States Patent and Trademark Office*